3,155,186
DRIVEN SWINGING AXLE ASSEMBLIES WITH STEERABLE WHEELS
Lamont A. Cadmus, Toledo, Ohio, and Achilles C. Sampietro, Birmingham, Mich., assignors to Willys Motors, Inc., Toledo, Ohio, a corporation of Pennsylvania
Filed July 21, 1961, Ser. No. 125,800
3 Claims. (Cl. 180—43)

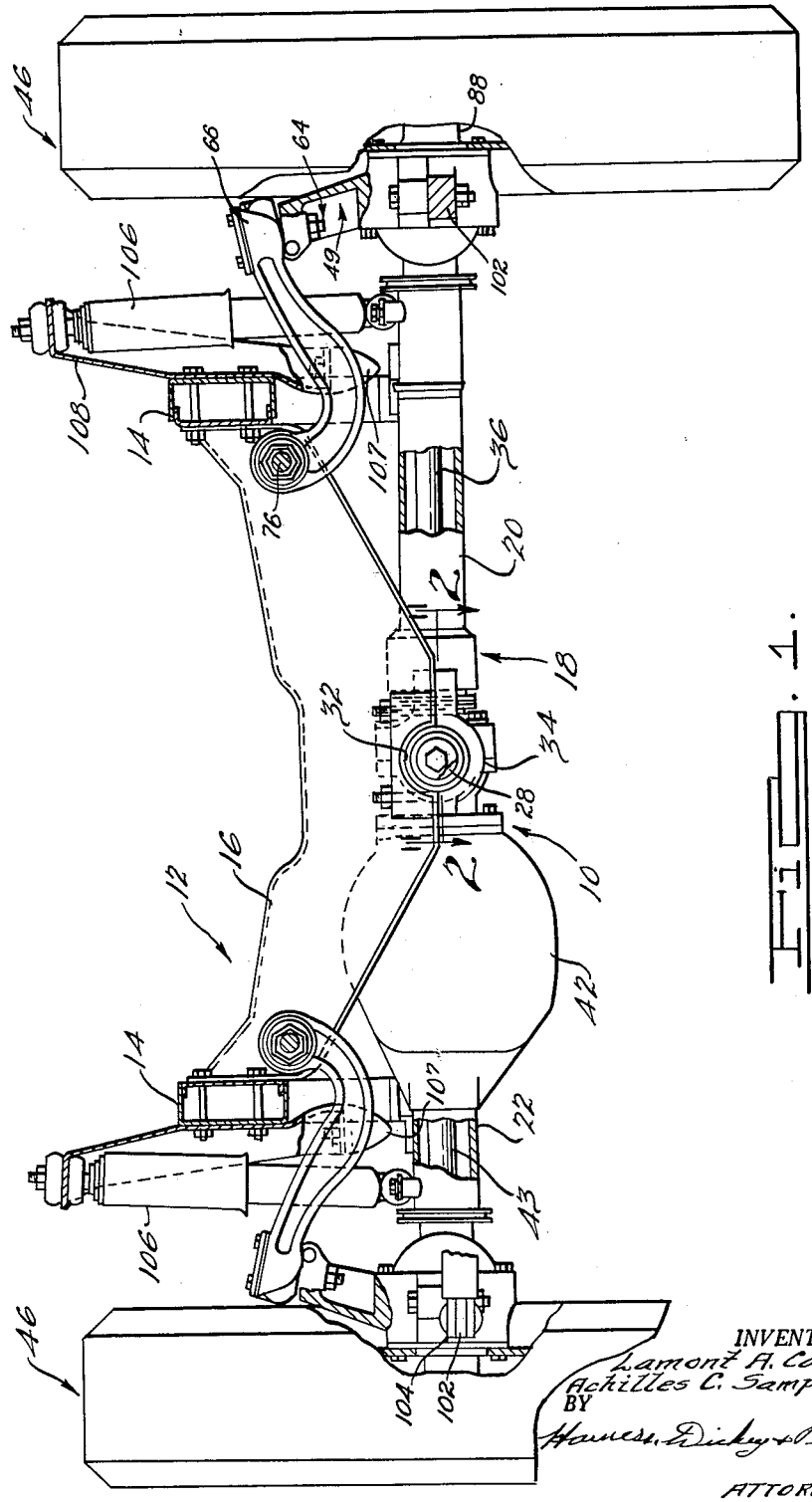

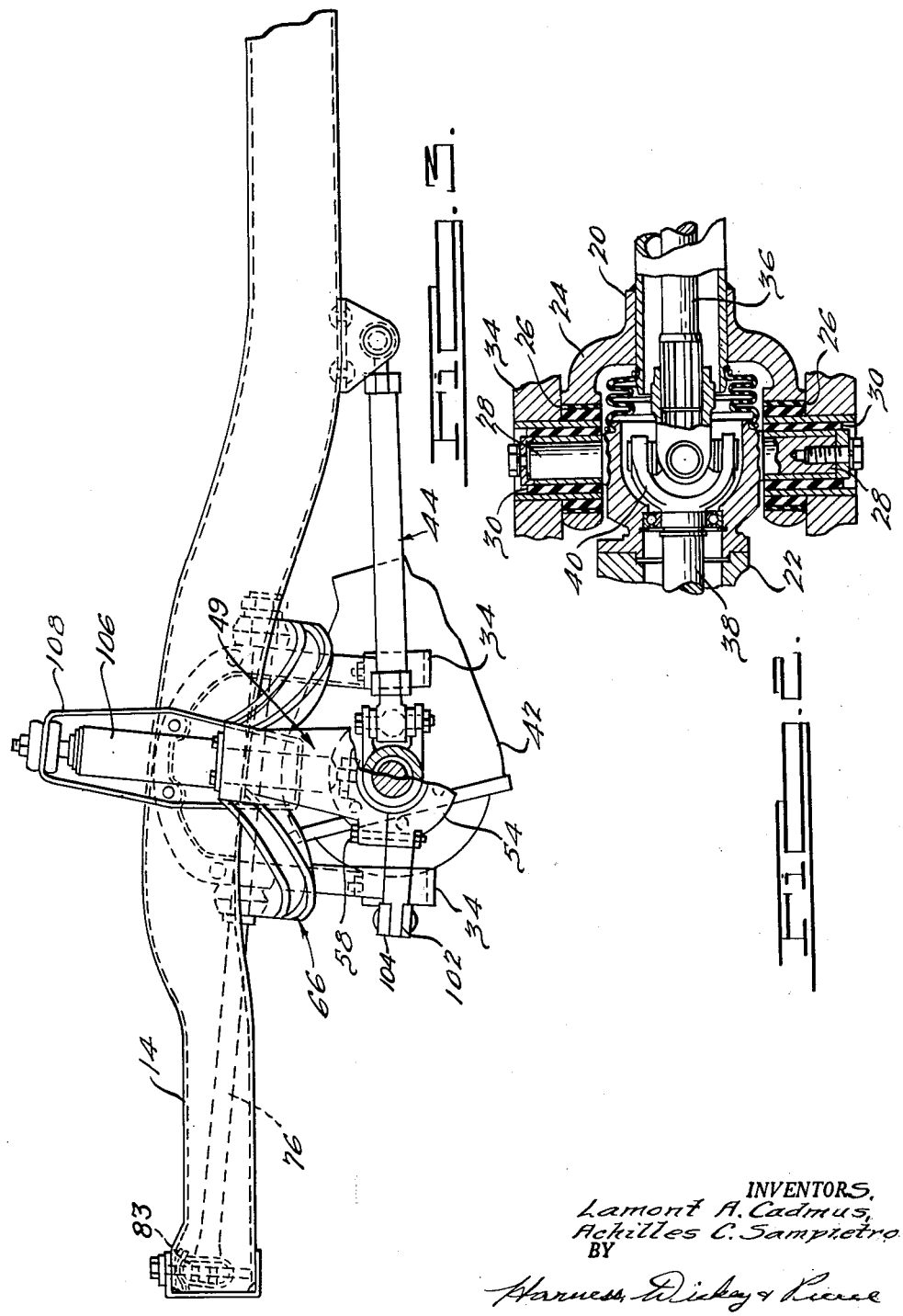

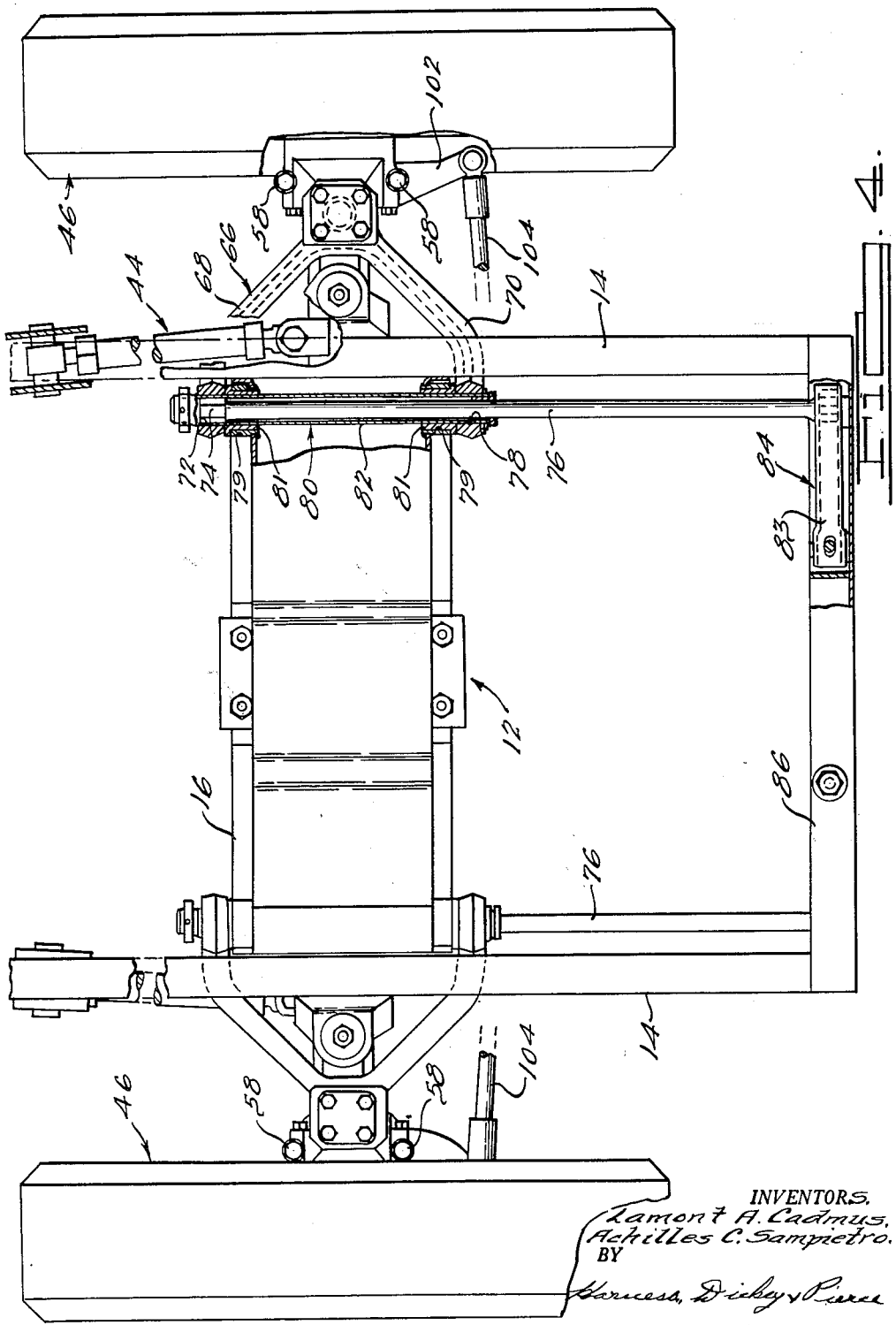

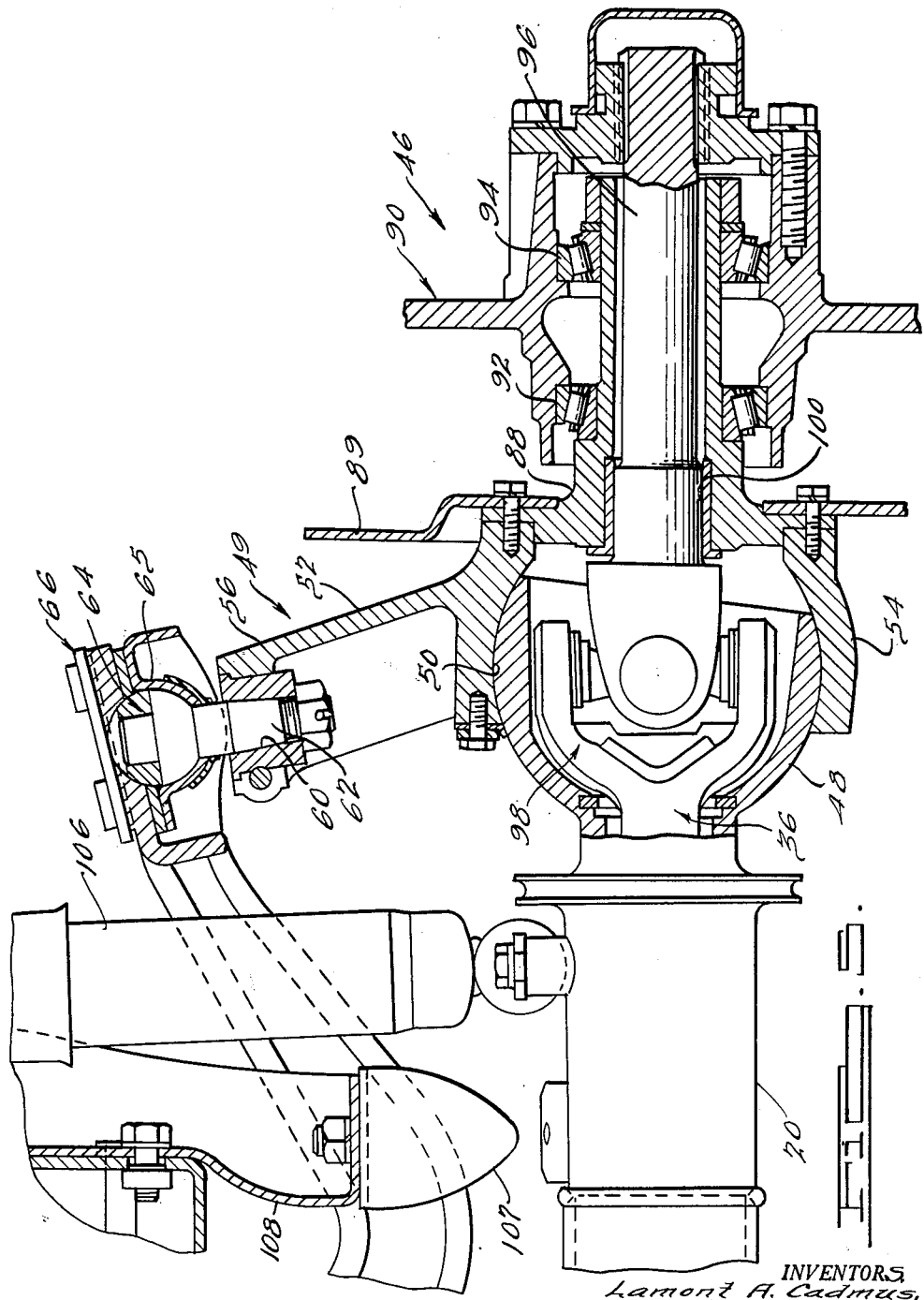

This invention relates to vehicle suspensions and more particularly to an independent suspension for an automotive vehicle.

While this invention is described in conjunction with the front suspension of a four-wheel drive vehicle, it should be understood that the features therein are not restricted in application to that particular type of vehicle, but are also applicable to a rear suspension, to a two- or four-wheel drive vehicle with two- or four-wheel steering, and to any combinations thereof.

It is common practice for four-wheel drive vehicles to have the front suspension of a solid axle design instead of an independent type suspension; in a solid axle design the dynamic loads on one wheel are, in part at least, transferred to the other wheel. In an independent front suspension each of the front wheels can move independently of the other and can be independently subjected to dynamic loads. In comparing a vehicle with a solid front axle and a vehicle with an independent front suspension, the ride and handling characteristics, including steering, are superior for the vehicle with the independent front suspension. In view of the above, it is an object of this invention to provide an independent front suspension for a four-wheel drive vehicle which produces improved ride and handling characteristics.

It is desirable that the center of gravity of a vehicle be near the ground to provide a vehicle of greater stability. One of the factors limiting the degree to which the height of a vehicle and, hence, center of gravity can be lowered is the physical location of the suspension components of the vehicle relative to the ground. It is an object of this invention to provide a modified suspension design facilitating the lowering of the vehicle chassis and, hence, the lowering of the center of gravity.

There are other factors entering into the stability of a vehicle other than the location of the center of gravity relative to the ground. By locating the roll center of the front suspension to a position closer to the center of gravity, the resultant moment of the center of gravity of the vehicle about the roll center is decreased, hence increasing the stability of the vehicle in roll. This, however, results in the front suspension having a high roll center which causes an increase in tire scrub and excessive tire wear. It is an object of this invention to provide an independent front suspension construction having a high roll center and in which the resultant scrub is minimized.

In an independent suspension in which the associated wheels are powered to drive the vehicle, it is common practice that a pair of universal joints be required for the axles and a pair of pivot joints be required for the associated control arms. This is done in order that each wheel may swing independently of the other. It is also common practice that the pivot points of the control arms for the powered wheels be different from the pivot points of the axle shafts energizing the powered wheels, thereby necessitating a slip-joint in the axle shaft. It is an object of this invention to provide an independent suspension in which only a single universal joint for the axle shafts and a single pivot joint for the control arms are required and in which the pivot point for the axle shafts is coincident with the pivot point of the control arms, thereby obviating the need for slip-joints in the axle shafts.

A problem in suspension design in steerable wheels is wheel fight as caused by a gyroscopic effect of the wheels. This effect becomes more pronounced when the wheels are subjected to high jounce and rebound loads. It is an object of this invention to provide a front suspension in which wheel fight is automatically minimized when the wheels are under high jounce and rebound loads.

Other objects, features, and advantages of the present invention will become apparent from the subsequent description and the appended claims, taken in conjunction with the accompanying drawings, in which:

FIGURE 1 is a front elevational view of a suspension system embodying the features of this invention in which some of the components are shown partially broken away and partially in section and in which the suspension is shown in conjunction with a portion of a vehicle chassis;

FIG. 2 is a fragmentary sectional view taken substantially along the line 2—2 in FIGURE 1;

FIG. 3 is a side elevational view of the suspension system of FIGURE 1, with some of the components removed and some partially broken away and some partially in section;

FIG. 4 is a top elevational view of the suspension system shown in FIGURE 1 with some of the components partially broken away and some partially in section; and FIG. 5 is a blown up view of a portion of the suspension system shown in FIGURE 1 with some of the components removed and some partially broken away and some partially in section.

In general, looking now to FIGURE 1, an independent front suspension is shown having means whereby the front wheels of the vehicle are drivable by a power plant and associated drive line (not shown) in conjunction with a conventional rear wheel drive (not shown) to drive the vehicle chassis (shown in part). In the suspension system shown in FIGURE 1, the axle housing which shields the axle drive shafts by which the wheels are powered is also used as the lower control arms for the front wheels. The axle housing is split with a single centrally located pivot joint connecting the split portions. This joint has its pivotal axis coincident with that of the universal joint associated with the axle shafts. By using the axle housing as the lower control arms, the vehicle can be designed with less ground clearance; if lower control arms independent of the axle housing were used, they would be located below the axle housing and would necessitate that much additional height to provide the same ground clearance. The suspension of FIGURE 1 is economical; since only one centrally located pivot joint is required between both axle housings, economy is realized. Also, by locating the pivotal axis of the pivot joint to be coincident with the pivotal axis of the universal joint associated with the axle shafts, no slip-joints in the axle shafts are required and, hence, another economy is realized. Furthermore, by providing a centrally located pivot joint, a lower control arm of maximum length for that vehicle is provided, thereby facilitating a reduction in the amount of scrub on the tires as they traverse through jounce and rebound positions. By so minimizing the amount of scrub, the roll center of the vehicle can be raised to provide increased stability in roll while still maintaining the scrub at a commercially acceptable level. The shock absorber is connected to the lower control arm or axle housing in the present invention to help combat wheel fight as a result of the gyroscopic effect in a manner to be described.

With this general background in mind, the more specific details of one construction of an independent front suspension, embodying the features of the present invention, will be described. In the following description similar components on either side of the vehicle serving similar functions and having similar constructions will be designated by the same numbers. More specifically now, an independent front suspension for a four-wheel or front-wheel drive vehicle is generally designated by the numeral 10 and is to be connected to a vehicle chassis, a portion of which is shown and generally indicated by the numeral 12. While the suspension is described with a vehicle having a frame, it is understood that the suspension would be equally applicable with a unitized construction. The chassis 12 comprises a pair of longitudinally extending side rails 14 having a forwardly located cross member 16 transversely secured therebetween.

An axle assembly 18 comprises a pair of axle housing members 20 and 22 interconnected to pivot about an axis centrally located with respect to the axle assembly 18. The axle assembly 18 is connected to the cross member 16 with its pivotal axis located centrally of that cross-member and, hence, centrally of the width of the vehicle. Looking now to FIG. 2, the axle housing member 20 terminates at its innermost end in a yoke portion 24 having a pair of in-line bores 26. The axle housing 22 terminates at its innermost end in a pair of outwardly extending ears 28 which are pivotally secured within the aligned bores 26 by means of a pair of silent block assemblies 30 which are of a construction well known in the art and are not described in detail herein. The axle assembly 18 is secured to the crossmember 16 at a centrally located semicircular portion 32 by means of a pair of brackets 34. As can best be seen in FIG. 2, the brackets 34 grip the silent block assemblies in such a manner that both axle housing members 20 and 22 are free to pivot independently of each other. In this manner then, the axle housing members 20 and 22 are independently pivotable about an axis centrally located with respect to the width of the vehicle.

Looking now to FIGS. 1 and 2, the axle housing member 20 has an axle shaft 36 rotatably disposed therein and the axle housing member 22 has an axle shaft 38 similarly rotatably disposed. Axle shafts 36 and 38 are connected by a universal joint assembly 40 which has its pivotal axis coincident with the pivotal axis of the axle housing members 20 and 22. By providing such coincidence of axes and by using the axle housings 20 and 22 as the lower control arms (in a manner to be described), the axle shafts 36 and 38 do not require a change in length relative to the lower control arms during swinging of the axle through jounce and rebound; thus the need for a slip-joint in the axle shafts 36 and 38 is obviated. Another advantage in using a single pivot joint having its axis centrally transversely of the vehicle is that the length of the lower control arms (here the axle housing members 20 and 22) are of the maximum length allowable with any particular vehicle.

The universal joint assembly 40 can be the conventional cross type or the constant velocity type. In the preferred embodiment, the less expensive cross type joint can be used since the pivotable angular variations are small at this joint and hence the rotational speed fluctuations are negligible.

The axle shaft 36 is interconnected at its outer end with one of a pair of wheel assemblies 46 for transmitting driving power thereto in a manner to be described. The axle shaft 38 is connected at its outermost end to one side of a differential assembly generally designated by the numeral 42. An axle shaft 43 similar to axle shaft 36 is rotatably disposed in the outer portion of the housing member 22 and is connected from the other side of the differential assembly 42 to the other one of the pair of wheel assemblies 46 for transmitting driving power thereto. The method of power transfer from a power plant (not shown) associated with the vehicle by means of a drive shaft (not shown) to the differential assembly 42 and thence to the associated axle shafts is done by means well known in the art and is not described in detail herein. The power then is delivered to one of the wheel assemblies 46 via the differential assembly 42 to axle shaft 38, universal joint 40, and axle shaft 36. The power from the other of the wheel assemblies 46 is delivered via the other side of the differential assembly 42 to an axle shaft 43. No universal joint is needed between the differential assembly 42 and shaft 43.

A pair of strut assemblies 44 (see FIGS. 3 and 4) are pivotally secured at one end to brackets outwardly disposed on the axle assembly 18 and are pivotally secured at the other end to brackets located on the side rails 14. The strut assemblies 44 react brake loads and other horizontal loads applied to the axle assembly 18 via the wheel assemblies 46.

Looking to FIGURE 5, the axle housing member 20 terminates at its outer extremity in a ball portion 48 which has a steering knuckle assembly 49 pivotally disposed thereon by means of a spherically contoured socket 50 in a steering knuckle 52. The socket 50 is defined by a pair of cavities in a lower member 54 and an upper member 56 of the steering knuckle 52 which are secured together by a pair of studs 58 (see FIGURES 3 and 4). The ball and socket arrangement described allows the necessary vertical and horizontal movement between the lower control arm (axle housing member 20) and the associated wheel assembly 46. A frictional connection is maintained between the ball 48 and the socket 50 for a purpose to be described.

A vertically extending portion of the upper arm member 56 of the steering knuckle 52 terminates in a portion having a tapered bore 60 in which a tapered stud 62 of a ball joint assembly 64 is secured by conventional means. A socket portion 65 of the ball joint assembly 64 is secured to the outer end of an upper control arm assembly 66 which has a pair of arms 68 and 70 (see FIGURE 4) having a spread sufficient to straddle the crossmember 16. The arms 68 and 70 are provided with a pair of in-line bores 72 and 78, respectively, which, when the control arm 68 is properly disposed relative to the crossmember 16, are in alignment with a pair of bores 79 through the crossmember 16. A pair of bushings 81 are located in bores 79 and a sleeve assembly 80 has a longitudinally extending sleeve member 82 disposed in the bores 79 of the crossmember 16 and in the bores 72 and 78 in the upper control arm 66. A torsion bar 76 passes through one end of the sleeve 82 and has a multifaced head 74 in engagement with a similarly faced internal portion on the end of the sleeve member 82; in a like manner, the sleeve member 82 is secured to the upper control arm 66 at the bore 72. Thus pivoting of the other upper control arm 66 in the bushings 81 via the sleeve member 82 causes rotation of the torsion bar 76. The other end of the torsion bar 76 is connected to a torsion bar anchor 83 of a height adjustment assembly 84. The torsion bar height adjustment assembly 84 is disposed in a front crossmember 86 secured between the side rails 14, the anchor 83 is pivotable about the axis of the torsion bar 76 and thus provides means for adjusting the torsion in the bar 76. The torsional loads exerted upon the torsion bar 76 by the upper control arm 66 as a result of the loads on the wheel assembly 46 are reacted in the front crossmember 86 through the height adjustment assembly 84.

In the steering knuckle assembly 49 the steering knuckle 52 has secured to it a brake backing plate 89 and a spindle portion 88 which has a pair of bearings 92 and 94 disposed thereon about which a wheel 90 (partially shown in FIG. 5) of the wheel assembly 46 is rotatable. The wheel 90 is secured by a spline or other suitable means to a drive shaft 96 which is disposed within the spindle portion 88 and is rotatable within a bearing 100 located therein. The drive shaft 96 and the axle shaft 36 are rotatably secured together by a universal joint assembly 98 located within the ball portion 48. The pivotal axes of the universal joint 98 and the ball portion 48 and socket 50 are coincident.

The universal joint assembly 98 can be the conventional cross type or the constant velocity type. In the preferred embodiment, the constant velocity type joint is used to prevent excessive rotational speed fluctuations due to the variations in the combined steering and suspension angles at this joint.

The lower portion 54 of the steering knuckle 52 terminates in an arm 102 (FIGS. 3 and 4) which is attached to a steering linkage assembly partially shown and designated by the numeral 104. The steering linkage 104 is connected to a steering gear (not shown) whereby the wheel assemblies 46 can be horizontally pivoted about the steering knuckle assemblies 49, thus allowing the vehicle to be steered.

As can be seen, the ball joint assembly (FIG. 5) comprising the ball portion 48 and the socket 50 to allow the wheel assemblies 46 to pivot in a horizontal plane during steering. Also, the wheel assembly 46 is free to pivot vertically about the ball portion 48 in traversing through the jounce and rebound positions. Thus the axle housing members 20 and 22 act fully as lower control arms while providing protection for the associated axle shafts. This latter feature is important since many four-wheel drive vehicles are used in off-the-road service. With the axle housing used as the lower control arm, the height of the vehicle can be lowered in comparison to a vehicle having a lower control arm independent of the axle housing for the same road clearance.

It was mentioned that the ball portion 48 and the socket 50 are in frictional contact. Note, however, that since the static weight of the vehicle is not imposed upon that ball joint assembly, the frictional force under normal driving and steering conditions is maintained at a level allowing the vehicle to be readily steered. It can be appreciated, however, that any increase in the friction between the ball portion 48 and the socket 50 requires an increase in steering effort. This feature is important since it is also true that an increase in friction causes a reduction in the amount of wheel fight or, in other words, a reduction in the amount of road-load forces transmitted back to the steering wheel. One of the factors contributing to wheel fight is the gyroscopic effect of the wheel assembly which causes a force to be exerted in a direction tending to steer the vehicle. The magnitude of the gyroscopic force is a function of the product of the moment of inertia of the rotating parts, in this case the wheel assembly, the angular velocity of the wheel assembly about its rotational axis, and the angular velocity of the wheel assembly about the roll center. Assuming now that the moment of inertia is fixed and that the rotation of the wheel assembly is at a constant angular velocity, the only other factor varying is the angular velocity of the wheel assembly about the roll center. While under normal driving conditions this factor will be low in magnitude it can be appreciated that it will be a maximum under maximum jounce and rebound loads and, at these instances, can cause a significant amount of wheel fight. In order to counteract the wheel fight, means are provided to dampen the latter factor discussed while still not impairing the steering effort under normal driving conditions. To accomplish this, velocity sensitive means are provided whereby the frictional force between the ball portion 48 and the socket 50 is increased in accordance with the angular velocity of the wheel assembly 46 about the roll center. More specifically, a shock absorber 106 is connected between the outer end of the lower control arm or axle housing member 20 (and 22) and to a shock tower 108 secured to the frame rail 14. The load or force taken by the shock absorber 106 is a function of the relative velocity at which it is moved inwardly or outwardly. Dynamic vertical road loads occurring at the wheel assembly 46 are transmitted to and reacted by the shock absorber 106 via the steering knuckle assembly 49 and the lower control arm or axle housing member 20. The reaction load occurring at the shock absorber 106 causes an increase in the normal force and hence an increase in the frictional force to occur between the ball portion 48 and the socket 50 having a magnitude varying in accordance with the load on the shock absorber. The frictional force diminishes the amount of wheel fight transmitted to the steering wheel. Thus, as the gyroscopic effect tends to cause more or less wheel fight depending upon the velocity of the wheel assembly 46 about the roll center, this tendency is countered by a correspondingly greater or lesser frictional force, depending also upon the velocity of the wheel assembly 46 as imparted to the shock absorber 106. Under normal driving conditions, when the shock absorber loads are minimal, the frictional force between the ball portion 48 and the socket 50 is normal and steering is unimpaired.

A jounce bumper 107 of rubber or other similar material is connected to the bottom of the shock tower 108 and prevents metal-to-metal contact under maximum jounce conditions.

Thus in the suspension just described, an independent front suspension for a front-wheel or four-wheel drive type vehicle has been shown having a construction utilizing only a single pivot joint and a single universal joint in the axle assembly; with this construction the need for a slip joint in the axle shafts is obviated. In this suspension the axle housing, which protects the axle shaft, is used as a lower control arm, thereby allowing the vehicle to be lower while still maintaining adequate ground clearance. A construction has been shown in which a lower control arm of maximum length is provided utilizing a centrally located pivot joint. The advantage of a longer lower control arm is that it allows the roll center of the vehicle to be raised to provide greater stability in roll while maintaining the amount of tire scrub at an acceptable level. Finally, the suspension design as shown and described herein provides means whereby wheel fight due to the gyroscopic effect is automatically minimized while still allowing for normal steering under normal driving conditions.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. An independent suspension system having wheels for driving and steering a vehicle comprising an axle assembly including a first and a second transversely extending axle housing member, one of said first and second axle housing members having a yoke portion defining a pair of in-line bores disposed coaxially relative to a longitudinally extending axis located substantially centrally of said axle assembly, the other of said first and second axle housing members having a pair of ears rotatably disposed within said in-line bores, bracket means connecting said yoke portion and said ears to the vehicle for pivotal movement about said axis, a differential assembly disposed in said first axle housing member, a first axle shaft rotatably disposed in said first axle housing member and connected to one side of said differential assembly and extending centrally toward said axis, a second axle shaft rotatably disposed in said second axle housing member and rotatably and pivotably secured to said first axle shaft at a point substantially on said axis and another axle shaft rotatably disposed in said first axle housing and connected to the other side of said differential assembly and extending away from said axis; a pair of steering knuckle assemblies each pivotally secured to an end portion of said first and second axle housing member; a pair of upper control arms each having one end pivotally secured to the vehicle and the other end pivotally secured to one of said pair of said steering knuckle assemblies; a pair of wheel assemblies rotatably secured to said pair of steering knuckle assemblies; means including said axle assembly for transmitting power to said wheel assemblies and steering means including said steering knuckle assemblies for steering said assemblies.

2. The independent suspension system of claim 1 with said bracket means pivotably securing said first and second axle housing members to the vehicle at said ears of said other of said housing members, and further including silent block means for rotatably connecting said ears within said in-line bores and said ears to said bracket means.

3. An independent suspension system having wheels for driving and steering a vehicle comprising an axle assembly including a pair of axle housing members, one of said axle housing members having a yoke portion defining a pair of in-line bores disposed coaxially relative to an axis located substantially centrally of said axle assembly, the other of said axle housing members having a pair of ears rotatably disposed within said in-line bores, bracket means pivotably securing said axle housing members to the vehicle at said ears of said other of said axle housing members, each of said axle housing members terminating in a ball portion at its outer extremity, each of a pair of steering knuckle assemblies being individual to one of said pair of axle housing members and each having a socket for frictionally matably receiving and for being pivotably secured to said ball portion of said one of said pair of axle housing members, each of a pair of wheel assemblies individual to and rotatably secured to one of said pair of steering knuckle assemblies, each of a pair of shock absorbers connected between one of said pair of axle housing members and the vehicle for changing the frictional force between said ball portion of said one of said pair of axle housing members and said socket of the associated one of said steering knuckle assemblies in accordance with the velocity of the associated one of said wheel assemblies about the roll center of suspension, a pair of upper control arms each having one end pivotably secured to the vehicle and the other end pivotably secured to one of said pair of steering knuckle assemblies, a spring member connected between the upper control arm and the vehicle, means including said axle assembly for transmitting power to said wheel assemblies and steering means including said steering knuckle assemblies for steering said wheel assemblies.

References Cited by the Examiner
UNITED STATES PATENTS

| | | | |
|---|---|---|---|
| 1,273,412 | 7/18 | Salsbury | 180—73 |
| 1,837,106 | 12/31 | Bucciali | 180—43 |
| 2,417,325 | 3/47 | Roos | 180—73 |
| 2,422,739 | 6/47 | Lewis | 180—73 |
| 2,635,704 | 4/53 | Herreshoff | 180—43 |
| 2,635,894 | 4/53 | Jackman | 280—96.2 |
| 2,818,128 | 12/57 | Uhlenhaut et al. | 180—73 |
| 2,968,358 | 1/61 | De Lorean | 180—73 |
| 3,042,133 | 7/62 | Ordorica | 180—43 |
| 3,075,600 | 1/63 | Ordorica et al. | 180—43 |

FOREIGN PATENTS

| | | |
|---|---|---|
| 758,480 | 11/33 | France. |
| 875,503 | 6/42 | France. |

A. HARRY LEVY, *Primary Examiner.*